US009638287B2

(12) United States Patent
Beck et al.

(10) Patent No.: US 9,638,287 B2
(45) Date of Patent: May 2, 2017

(54) MULTI-SPEED TRANSMISSION IN PLANETARY DESIGN

(71) Applicant: ZF Friedrichshafen AG, Friedrichshafen (DE)

(72) Inventors: Stefan Beck, Eriskirch (DE); Christian Sibla, Friedrichshafen (DE); Wolfgang Rieger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/769,583

(22) PCT Filed: Jan. 22, 2014

(86) PCT No.: PCT/EP2014/051171
§ 371 (c)(1),
(2) Date: Aug. 21, 2015

(87) PCT Pub. No.: WO2014/127945
PCT Pub. Date: Aug. 28, 2014

(65) Prior Publication Data
US 2016/0003329 A1  Jan. 7, 2016

(30) Foreign Application Priority Data

Feb. 22, 2013  (DE) .................. 10 2013 202 886

(51) Int. Cl.
*F16H 3/66* (2006.01)
*F16H 3/44* (2006.01)

(52) U.S. Cl.
CPC ......... *F16H 3/66* (2013.01); *F16H 2003/442* (2013.01); *F16H 2003/445* (2013.01);
(Continued)

(58) Field of Classification Search
CPC .............. F16H 3/66; F16H 2200/0065; F16H 2200/2046; F16H 2200/201
(Continued)

(56) References Cited

U.S. PATENT DOCUMENTS 7,819,772 B2  10/2010  Tenberge
8,617,023 B1 * 12/2013  Noh .......................... F16H 3/66
475/207

(Continued)

FOREIGN PATENT DOCUMENTS

JP  2010-038333  2/2010
JP  2011-017424  1/2011
(Continued)

OTHER PUBLICATIONS

PCT Search Report, May 8, 2014.
PCT Search Report and Written Opinon, May 8, 2014.
German Patent Office Search Report, Oct. 31, 2013.

*Primary Examiner* — Roger Pang
(74) *Attorney, Agent, or Firm* — Dority & Manning, P.A.

(57) ABSTRACT

A multi-speed transmission in planetary design with a housing is proposed. A first shaft (1) is provided as a drive (AN) and a second shaft (2) is provided as an output (Ab) arranged axially parallel to the drive. Three planetary gear sets (RS1, RS2, RS3) and additional shafts (3-9) along with six shifting elements (K1, K2, K3, K4, B1, B2) are provided for the actuation of several gears. Machine elements (ST1, ST2) are provided for the transfer of torque between the drive (AN) and the output (Ab). The first shaft (1) is connectable or connected, as a drive, to a sun gear (SR1) of the first planetary gear set (RS1), to the sun gear (SR3) of the third planetary gear set (RS3), and to the planetary gear carrier (PT2) of the second planetary gear set (RS2). The second shaft (2), as an output shaft (Ab), is connectable or con-
(Continued)

nected to the first machine element (ST1) and to the second machine element (ST2).

38 Claims, 8 Drawing Sheets

(52) U.S. Cl.
CPC ............... *F16H 2200/0065* (2013.01); *F16H 2200/201* (2013.01); *F16H 2200/2046* (2013.01)

(58) Field of Classification Search
USPC .......................................... 475/275–291, 903
See application file for complete search history.

(56) References Cited

U.S. PATENT DOCUMENTS

| | | | | |
|---|---|---|---|---|
| 9,011,288 B2* | 4/2015 | Beck | ................. | F16H 3/66 475/275 |
| 9,022,985 B2* | 5/2015 | Heinrich | ............ | A61B 17/3462 604/167.01 |
| 9,039,561 B2* | 5/2015 | Beck | ................. | F16H 3/66 475/275 |
| 9,188,199 B2* | 11/2015 | Beck | ................. | F16H 3/66 |
| 9,353,834 B2* | 5/2016 | Beck | ................. | F16H 3/66 |
| 9,382,979 B2* | 7/2016 | Beck | ................. | F16H 3/66 |
| 9,394,974 B2* | 7/2016 | Beck | ................. | F16H 3/66 |
| 2009/0098974 A1 | 4/2009 | Phillips | | |
| 2010/0035718 A1 | 2/2010 | Saitoh | | |
| 2010/0311534 A1 | 12/2010 | Sugino | | |
| 2015/0031498 A1* | 1/2015 | Beck | ................. | F16H 3/66 475/317 |
| 2015/0354680 A1* | 12/2015 | Janson | ................. | F16H 37/042 475/277 |

FOREIGN PATENT DOCUMENTS

| | | |
|---|---|---|
| JP | 2012-127398 | 7/2012 |
| JP | 2012-127399 | 7/2012 |

* cited by examiner

Fig. 1

| Gang (gear) | geschlossene Schaltelemente (engaged shifting elements) | | | | | | Über- setzung (ratio) i | Gang- sprung (step) φ |
|---|---|---|---|---|---|---|---|---|
| | Bremse (brake) | | Kupplung (clutch) | | | | | |
| | B1 | B2 | K1 | K2 | K3 | K4 | | |
| G1 | | X | | X | | X | 4,690 | |
| G2 | X | | | X | | X | 2,762 | 1,698 |
| G3 | | | X | X | | X | 1,804 | 1,531 |
| G4 | | | | X | X | X | 1,298 | 1,390 |
| G5 | | | X | X | X | | 1,000 | 1,298 |
| G6 | X | | | X | X | | 0,831 | 1,204 |
| G7 | | X | | X | X | | 0,784 | 1,131 |
| G8 | X | X | | | X | | 0,650 | 1,166 |
| G9 | | X | X | | X | | 0,532 | 1,184 |
| R | | X | X | | | X | -3,635 | Gesamt (total) 8,619 |
| M1 | X | | | | X | X | 1,298 | |
| M2 | | X | | | X | X | 1,298 | |
| M3 | | | X | | X | X | 1,298 | |

MULTI-SPEED TRANSMISSION IN PLANETARY DESIGN

FIELD OF THE INVENTION

The present invention relates to a multi-speed transmission in planetary design for a vehicle.

BACKGROUND

As an example, publication DE 10 2007 014 150 A1 discloses a load-shiftable multi-speed transmission. With the multi-speed transmission, the drive shaft is firmly connected through a torsional vibration damper to a first shaft of a first shaft train. A second shaft train arranged parallel to this includes, among other things, the two output shafts designated as shafts. The two shaft trains are connected to each other through three spur gear stages. A first three-shaft planetary gear stage is located on the first shaft train. A second planetary gear stage and a third planetary gear stage are located on the second shaft train. Thus, the multi-speed transmission comprises ten shafts that are connected to each other through three spur gear stages and three planetary gear stages. To shift the eight forward gears and one reverse gear, five shifting elements are necessary. The provided shifting elements are hydraulically operated.

In order to reduce hydraulic losses, the shifting elements are to be arranged in a manner that is easily accessible from the outside. However, with a front-transverse installation of the transmission in a vehicle, only a limited axial installation space is available.

SUMMARY OF THE INVENTION

The present invention is subject to a task of providing a multi-speed transmission with the highest possible number of gears and an easy accessibility of the shifting elements, with, at the same time, a good gearing efficiency and a need for axial installation space that is as low as possible. Additional objects and advantages of the invention will be set forth in part in the following description, or may be obvious from the description, or may be learned through practice of the invention.

The tasks are solved by the characteristics of the transmission embodiments set forth herein.

Accordingly, a load-shiftable multi-speed transmission in planetary design, or a multiple-gear planetary transmission for a vehicle with a housing, is proposed, whereas the drive or the drive shaft, as the case may be, and the output or the output shaft, as the case may be, are arranged in a manner that is axially parallel to each other for a preferred front-transverse installation. The multi-speed transmission in accordance with the invention comprises only nine shafts, three planetary gear sets, and only six shifting elements, in order to realize at least nine forward gears and one reverse gear. In addition, for the coupling of the drive and the output, it is preferable that only two machine elements are provided.

Given the fact that the first shaft, as a drive, is detachably connected, or connectable or connected, to the sun gears of the first and the third planetary gear sets and to the planetary gear carrier of the second planetary gear set and that the second shaft, as an output, is connected, or is detachably connected or connectable, to the first machine element and to the second machine element, a multi-speed transmission in accordance with the invention that enables an actuation of the shifting elements that improves the degree of efficiency and is thus in line with demand arises. The advantageously low number of transmission elements of the multi-speed transmission for a front-transverse design has its transmission elements nested with each other in such a manner that an arrangement that particularly saves axial installation space is enabled. In addition to the improved degree of efficiency, low component stresses and low construction costs arise.

The easy accessibility of the shifting elements may be realized, among other things, on the one hand through the use of brakes as shifting elements and, on the other hand, through the use of clutches as shifting elements, which are preferentially positioned at outside shafts, preferably at the drive and at the output, with the multi-stage transmission in accordance with the invention. Due to the low construction costs, in an advantageous manner, low product costs and a low weight of the multi-speed transmission in accordance with the invention arise.

Within the framework of a possible embodiment of the invention, it can be provided that, as a machine element for the coupling or for the transfer of torque between the drive and the output, at least one spur gear stage or the like, which realizes the transmission ratio for the output differential, is used. Preferably, only two machine elements or spur gear stages are provided. However, other machine elements for the transmission of power, such as chains, belts or the like, may be used.

Viewed in an axial direction, the planetary gear sets are arranged in the order of first planetary gear set, second planetary gear set, and third planetary gear set, whereas it is preferable that three negative planetary gear sets are provided. However, at spots where the binding ability allows it, individual or several negative planetary gear sets may be converted into positive planetary gear sets, if, at the same time, the bar connection or planetary gear carrier connection and the ring gear connection are exchanged, and the amount of the stationary transmission ratio is increased by the value of 1.

As is well-known, a negative planetary gear set features, at the planetary gear carrier, rotatably mounted planetary gears, which mesh with the sun gear and the ring gear of such planetary gear set, such that, with a planetary gear carrier that is held down and a rotating sun gear, the ring gear rotates in a direction opposite to the direction of rotation of the sun gear.

As is well-known, a positive planetary gear set features, at its planetary gear carrier, inner and outer planetary gears that are rotatably mounted and are in a tooth meshing with each other, whereas the sun gear of such planetary gear set meshes with the inner planetary gears, and the ring gear of such planetary gear set meshes with the outer planetary gears, such that, with a planetary gear carrier that is held down and a rotating sun gear, the ring gear rotates in the same direction as the direction of rotation of the sun gear.

Within the framework of a particular embodiment of the invention, it can be provided that several of the planetary gear sets are arranged radially one above the other. For the coupling of the nested planetary gear sets, for example, the ring gear of the inner planetary gear set and the sun gear of the outer planetary gear set are designed as one component. For this purpose, for example, the ring gear of the inner planetary gear set features an inner toothing and an outer toothing, but other embodiments are conceivable. Regardless of the type of coupling, the planetary gear sets that are nested in one another are essentially arranged in one axial plane, such that, in an advantageous manner, axial installation space is saved.

With the multi-speed transmission in accordance with the invention, a hydrodynamic torque converter or a hydrodynamic clutch can be used as the start-up element. It is also conceivable that an additional start-up clutch or an integrated start-up clutch or a start-up brake are used. Furthermore, it is possible that an electric machine or any other power source is arranged at at least one of the shafts. Moreover, at at least one of the shafts, a freewheel is arranged for the housing or for another shaft.

Preferably, with the multi-speed transmission in accordance with the invention, nine forward gears and at least one reverse gear can be shifted by means of the provided shifting elements. However, it is conceivable that, for the fourth forward gear (for example), additional shifting combinations are made possible by combining other shifting elements.

Under term "shifting element," a shiftable connection between two elements of the transmission is understood, whereas the torque to be transferred between such two elements is transferred by means of the force closure or frictional closure or by means of the form closure. If both elements of the shiftable connection are designed to rotate, the shifting element is referred to as a clutch, and if only one of the two elements of the shiftable connection rotates, the shifting element is referred to as a brake. Moreover, the geometric position and/or order of the individual shifting elements can be freely selected, as long as the binding ability of the elements allows this. In this manner, individual elements may be arbitrarily moved into any position. In addition, to the extent permitted by the external shape, several gear sets can be arranged radially above one another, thus in a nested manner.

Embodiments of a force-fitting shifting element include multi-disk clutches or brakes, band brakes, cone clutches or brakes, electromagnetic clutches, magnetic powder clutches and electro-rheological clutches. Embodiments of a positive-locking shifting element include claw clutches or brakes and tooth clutches.

Thus, in general, both frictional-locking and positive-locking shifting elements may be used as shifting elements. Preferably, given their characteristics, in particular the second shifting element designed as a clutch and the fourth shifting element designed as a clutch can be designed as claw shifting elements, by which significant consumption advantages can be achieved.

BRIEF DESCRIPTION OF THE DRAWINGS

In the following, the present invention is explained in more detail based on the drawing. The following is shown.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Each of FIGS. 1 to 7 shows an example of a design variant of the multi-speed transmission in planetary design in accordance with the invention, for example as an automatic gearbox or automatic transmission, for a vehicle.

Regardless of the particular design variants, the multi-speed transmission comprises a merely schematically indicated housing 11, with a first shaft 1 as a drive AN and a second shaft 2 as an output Ab that is arranged in a manner axially parallel to the drive, along with seven additional shafts 3, 4, 5, 6, 7, 8, 9. Furthermore, a first planetary gear set RS1, a second planetary gear set RS2, and a third planetary gear set RS3 are provided, whereas each of the first planetary gear set RS1, the second planetary gear set RS2 and the third planetary gear RS3 is preferably designed as a negative planetary gear set. For shifting several gears, a first shifting element K1 designed as a clutch, a second shifting element K2 designed as a clutch, a third shifting element K3 designed as a clutch, a fourth shifting element K4 designed as a clutch, a fifth shifting element B1 designed as a brake, and a sixth shifting element B2 designed as a brake are provided. For the coupling or for the transfer of torque between the drive An and the output Ab, two arbitrary machine elements are preferably provided; with the design variants, these are designed, for example, as a first spur gear stage ST1 and a second spur gear stage ST2.

Figure 2:
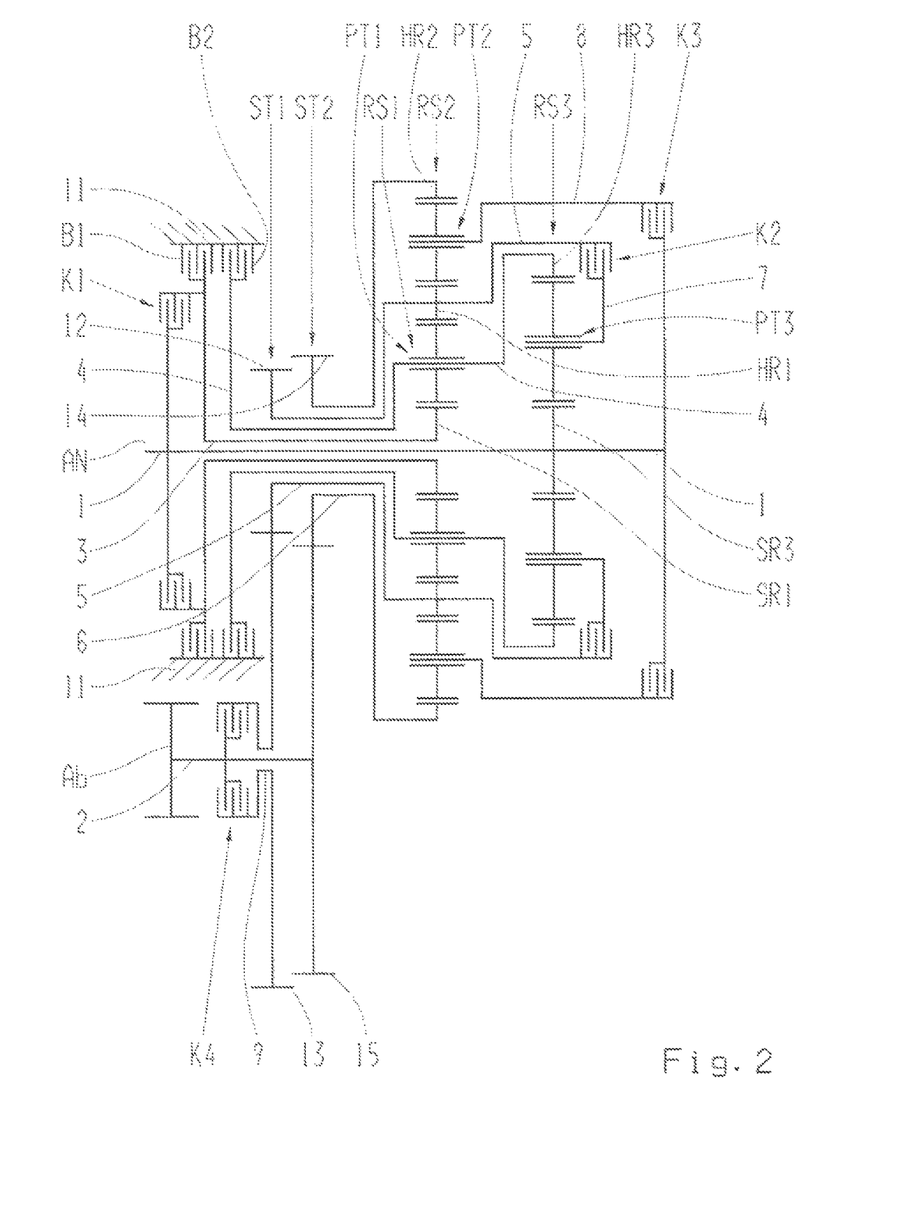
FIG. 2 is a schematic view of a second design variant of the multi-speed transmission.
Figure 3:
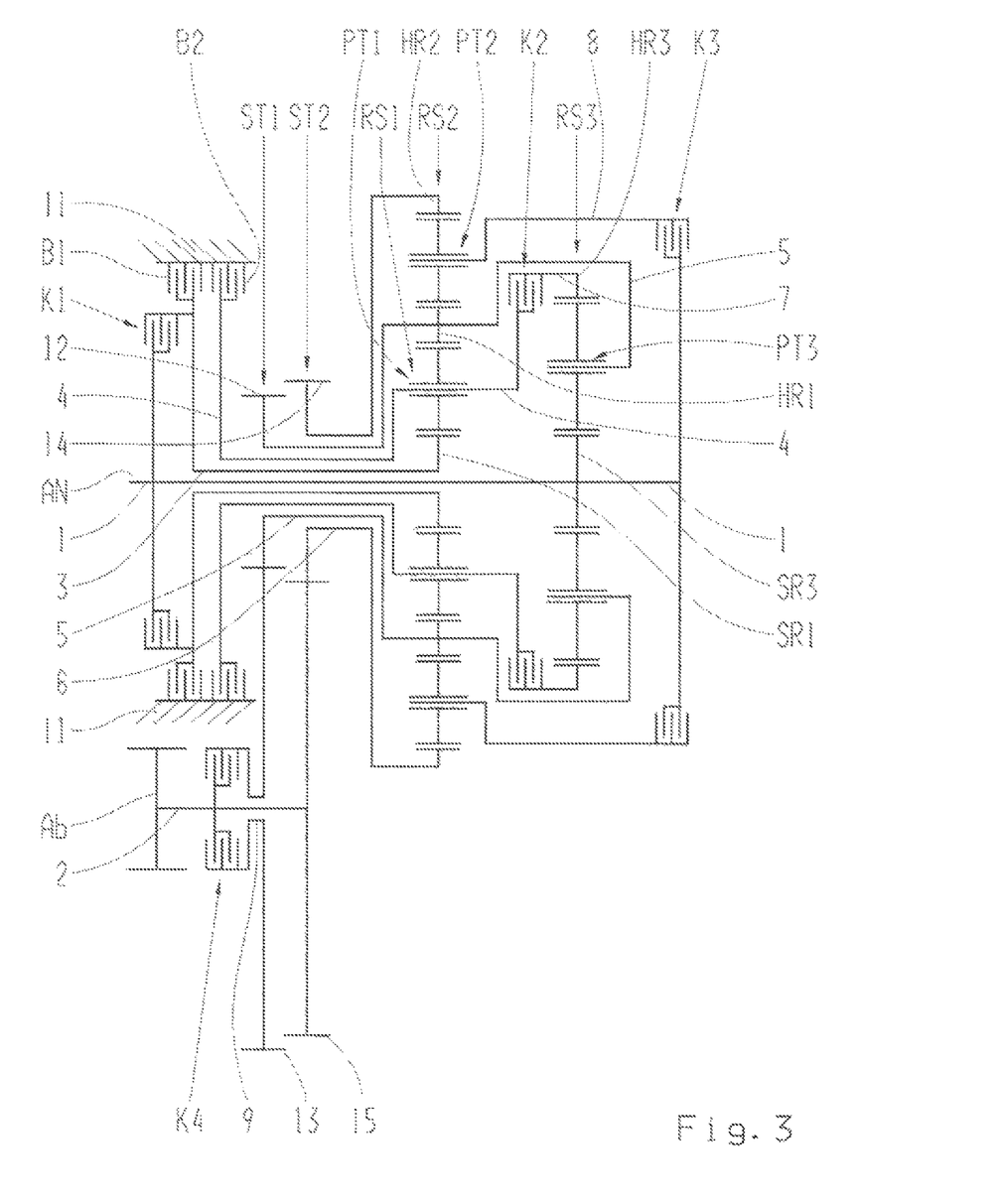
FIG. 3 is a schematic view of a third design variant of the multi-speed transmission.
Figure 4:
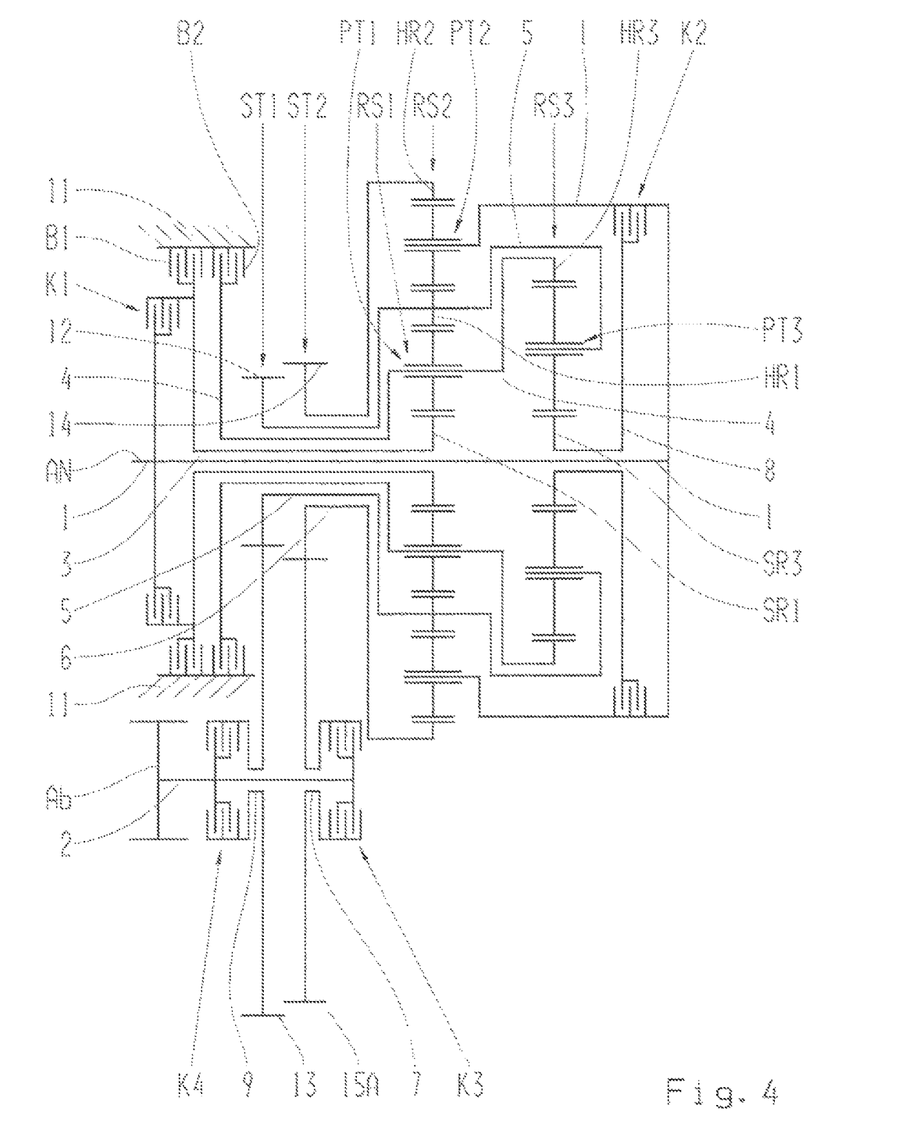
FIG. 4 is a schematic view of a fourth design variant of the multi-speed transmission.
Figure 5:
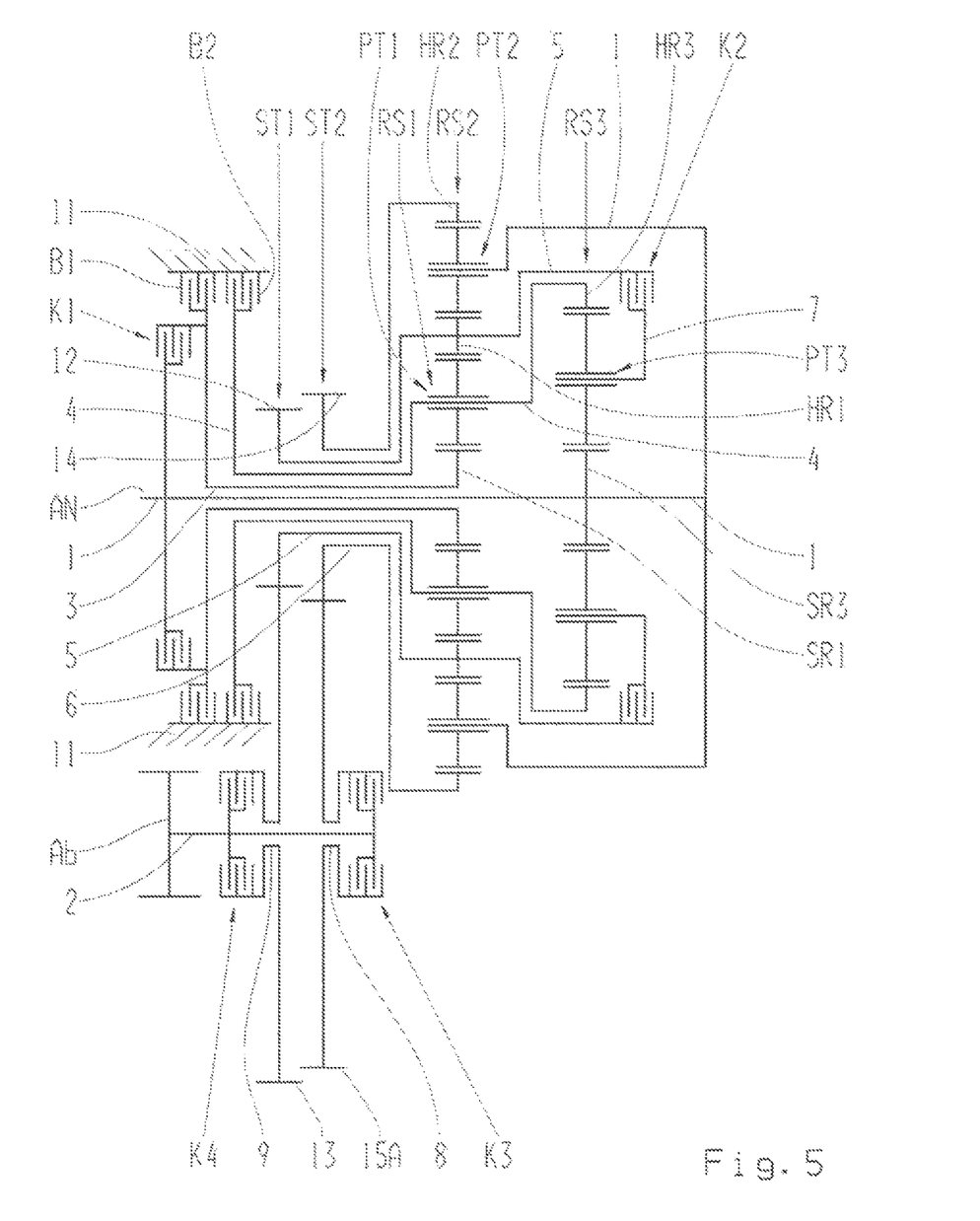
FIG. 5 is a schematic view of a fifth design variant of the multi-speed transmission.
Figure 6:
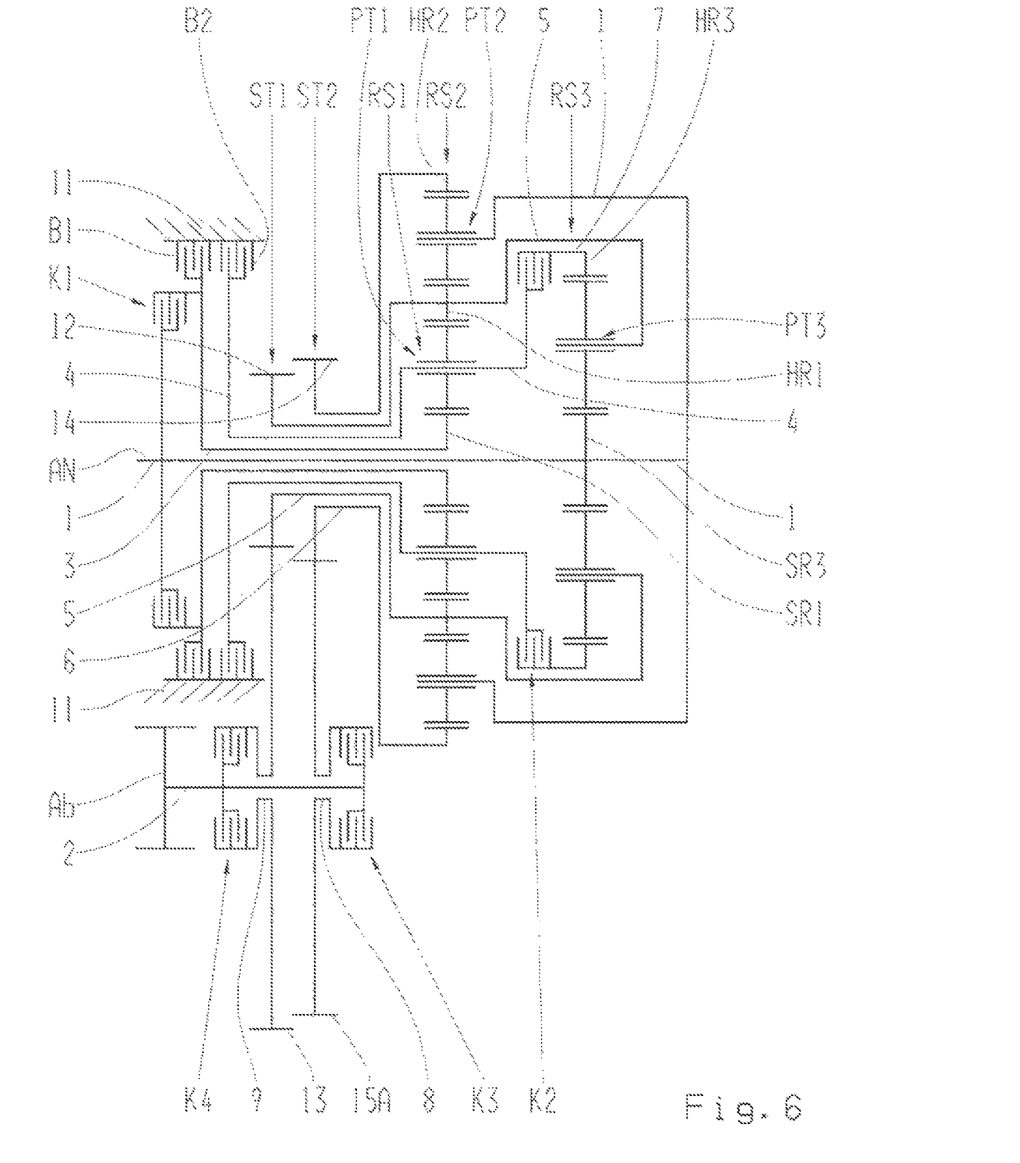
FIG. 6 is a schematic view of a sixth design variant of the multi-speed transmission.
Figure 7:
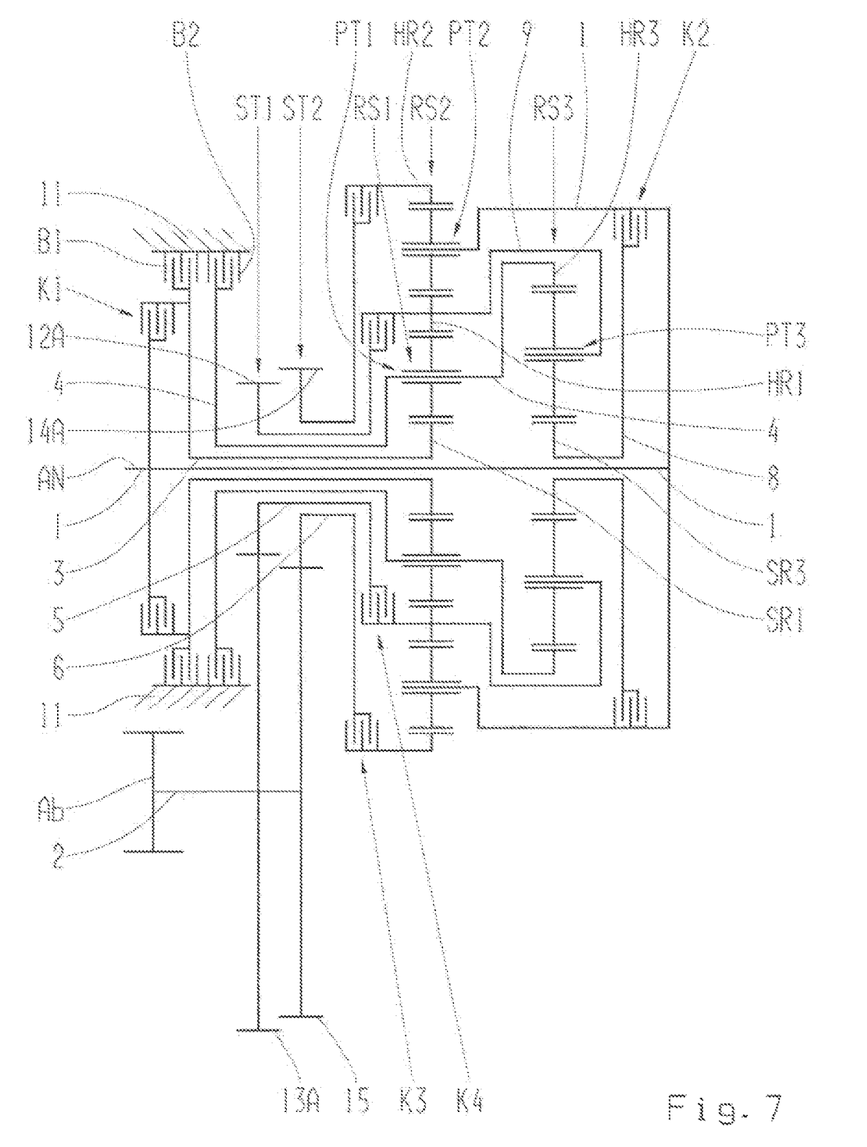
FIG. 7 is a schematic view of an alternative design of the fourth design variant of the multi-speed transmission.

In relation to the design variant in accordance with FIG. 1, FIGS. 2 to 7 show transmission variants with the same effect, whereas FIG. 7 shows a possible variation of the fourth design variant in accordance with FIG. 4, with which the shifting elements K3 and K4 allocated to the spur gear stages ST1 and ST2 are shifted from the output shaft or intermediate shaft, as the case may be, to the main shaft or the drive shaft, as the case may be. The different design variants in accordance with FIGS. 1 to 7 do not functionally differ from the design variants in accordance with FIG. 1 with respect to degree of efficiency, grading, etc.

With respect to the connection options between the provided shafts 1, 2, 3, 4, 5, 6, 7, 8, 9, the provided three planetary gear sets RS1, RS2, RS3, the provided housing 11 and the provided shifting elements K1, K2, K3, K4, B1, B2 along with the provided spur gear stages ST1, ST2, with the term "connectable, it is to be understood that the described elements are detachable (for example, connected by a shifting element), such that the connection is locked with an activated shifting element and open with a non-activated shifting element. The detachable connection may be realized through, in addition to the shifting element, an additional element such as a shaft or the like. With the term "connected," it is to be understood that the described elements are connected to each other in a manner that is virtually fixed, thus not detachable. A direct or indirect connection (for example, through additional elements) may be realized.

In accordance with the invention, it is provided with the multi-speed transmission that the first shaft 1 is detachably connected, or connectable or connected, as a drive, to the sun gear SR1 of the first planetary gear set RS1, to the sun gear SR3 of the third planetary gear set RS3 and to the planetary gear carrier PT2 of the second planetary gear set RS2. Depending on the design variant, the second shaft is detachably connected, or connected or connectable, as output Ab, to the first machine element or to the first spur gear stage ST1, as the case may be, and to the second machine element or the second spur gear stage ST2, as the case may be.

Regardless of the particular design variants, it is provided that the first shaft 1 is connectable through the first shifting element K1 designed as a clutch and through the third shaft 3 to the sun gear SR1 of the first planetary gear set RS1, whereas the sun gear SR1 of the first planetary gear set RS1 is connectable, through a fifth shifting elements B1 designed as a brake, to the housing 11.

Moreover, it is provided with all design variants that two of the three planetary gear sets RS1, RS2, RS3 are arranged radially one above the other, and thus lie essentially in one common axial plane. For this purpose, the first planetary gear set is arranged radially inwardly and the second planetary gear set RS2 is arranged radially outwardly, whereas the ring gear HR1 of the first planetary gear set RS1 serves as the connecting link between the two planetary gear sets RS1 and RS2.

Figure 1:
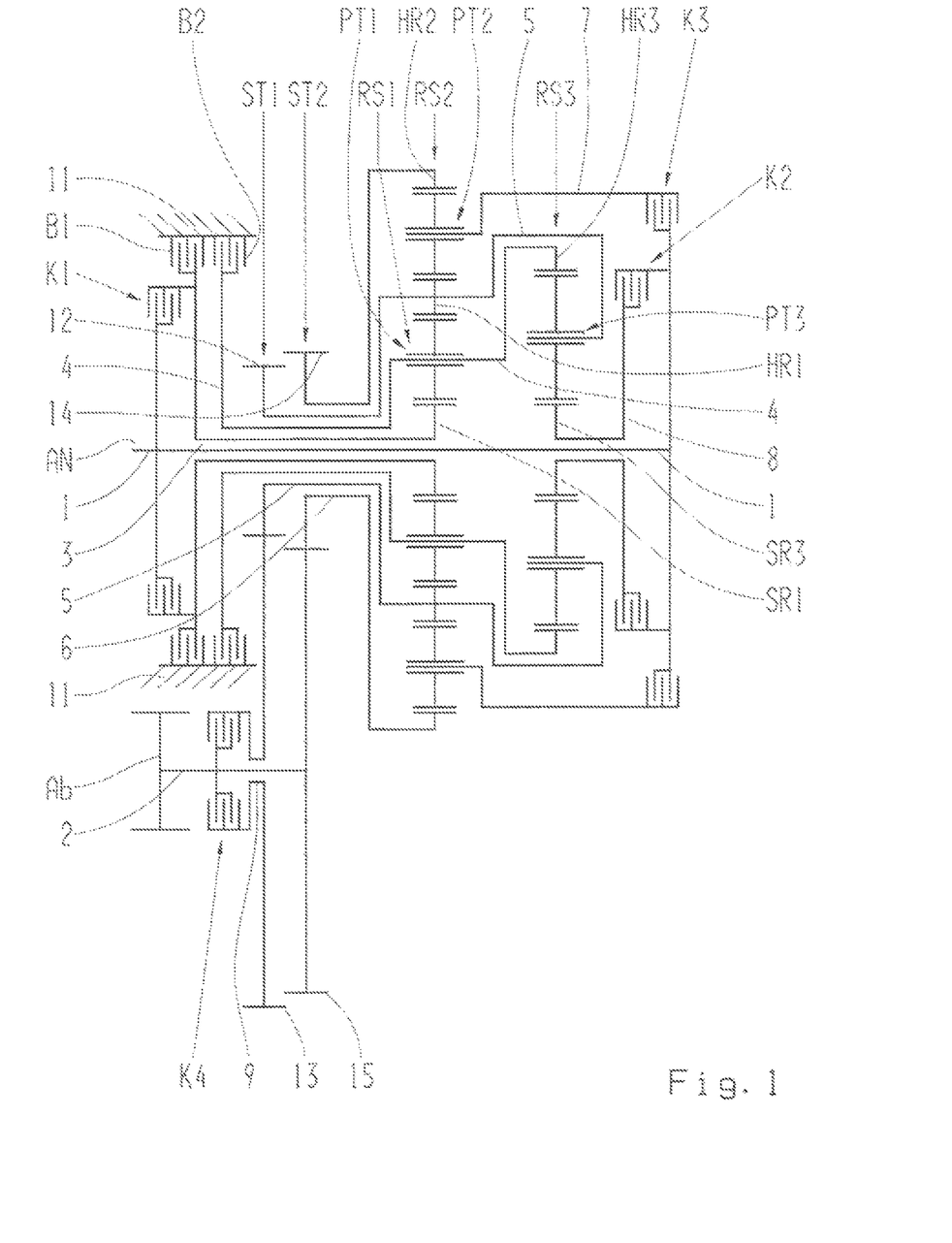
FIG. 1 is a schematic view of a first design variant of a multi-speed transmission in accordance with the invention.

With the first design variant in accordance with FIG. 1, it is provided with the multi-speed transmission in accordance with the invention that the first shaft 1 is connectable through the second shifting element K2 designed as a clutch and through the eighth shaft 8 to the sun gear SR3 of the third planetary gear set RS3. Furthermore, the first shaft 1 is connectable through the third shifting element K3 designed as a clutch and through the seventh shaft 7 to the planetary gear carrier PT2 of the second planetary gear set RS2. Moreover, the second shaft 2 is connectable through the fourth shifting element K4 designed as a clutch and through the ninth shaft 9 to the idler gear 13 of the first spur gear stage ST1. In addition, the second shaft 2 is connected to the fixed gear 15 of the second spur gear stage ST2.

With the second and third design variant in accordance with FIGS. 2 and 3, it is provided that the first shaft 1 is connected to the sun gear SR3 of the third planetary gear set RS3. Furthermore, the first shaft 1 is connectable through the third shifting element K3 designed as a clutch and through the eighth shaft 8 to the planetary gear carrier PT2 of the second planetary gear set RS2. In addition, the second shaft 2 is connectable through the fourth shifting element K4 designed as a clutch and through the ninth shaft 9 to the idler gear 13 of the first spur gear stage ST1. Moreover, the second shaft 2 is connected to the fixed gear 15 of the second spur gear stage ST2.

In accordance with FIG. 4, it is provided with the fourth design variant that the first shaft 1 is connected to the planetary gear carrier PT2 of the second planetary gear set RS2. Furthermore, the first shaft 1 is connectable through the second shifting element K2 designed as a clutch and through the eighth shaft 8 to the sun gear SR3 of the third planetary gear set RS3. Moreover, the second shaft 2 is connectable through the fourth shifting element K4 designed as a clutch and through the ninth shaft 9 to the idler gear 13 of the first spur gear stage ST1. In addition, the second shaft 2 is connectable through the third shifting element K3 designed as a clutch and through the seventh shaft 7 to the idler gear 15A of the second spur gear stage ST2.

With the fifth and sixth design variants in accordance with FIGS. 5 and 6, it is provided that the first shaft 1 is connected to the sun gear SR3 of the third planetary gear set RS3 and to the planetary gear carrier PT2 of the second planetary gear set RS2. In addition, the second shaft 2 is connectable through the fourth shifting element K4 designed as a clutch and through the ninth shaft 9 to the idler gear 13 of the first spur gear stage ST1. Furthermore, the second shaft 2 is connectable through the third shifting element K3 designed as a clutch and through the eighth shaft 8 to the idler gear 15A of the second spur gear stage ST2.

Finally, with the seventh design variant in accordance with FIG. 7, it is provided with the multi-speed transmission that the first shaft 1 is connected to the planetary gear carrier PT2 of the second planetary gear set RS2. Furthermore, the first shaft 1 is connectable through the second shifting element K2 designed as a clutch and through the eighth shaft 8 to the sun gear SR3 of the third planetary gear set RS3. Moreover, the second shaft 2 is connected to the fixed gear 13A of the first spur gear stage ST1, and the second shaft 2 is connected to the fixed gear 15 of the second spur gear stage ST2.

With the first, second, fourth, fifth and seventh design variants in accordance with FIGS. 1, 2, 4, 5 and 7, it is provided with the multi-speed transmission that the planetary gear carrier PT1 of the first planetary gear set RS1 and the ring gear HR3 of the third planetary gear set RS3 are connected through the fourth shaft 4, whereas the planetary gear carrier PT1 of the first planetary gear set RS1 and the ring gear HR3 of the third planetary gear set RS3 are connectable, through the fourth shaft 4 and through the sixth shifting element B2 designed as a brake, to the housing 11. However, in accordance with FIGS. 3 and 6, it is provided with the third and sixth design variants that the planetary gear carrier PT1 of the first planetary gear set RS1 is connectable through the fourth shaft 4 and through the second shifting element K2 designed as a clutch and through the seventh shaft 7 to the ring gear HR3 of the third planetary gear set RS3, whereas the planetary gear carrier PT1 of the first planetary gear set RS1 and the ring gear HR3 of the third planetary gear set RS3 are connectable, through the fourth shaft 4 and through the sixth shifting element B2 designed as a brake, to the housing 11.

With the first, third, fourth and sixth design variants in accordance with FIGS. 1, 3, 4 and 6, it is provided with the multi-speed transmission in accordance with the invention that a fixed gear 12 of a first spur gear stage ST1 is connectable through the fifth shaft 5 to the ring gear HR1 of the first planetary gear set RS1 and to the planetary gear carrier PT3 of the third planetary gear set RS3. In accordance with FIGS. 2 and 5, it is provided with the second and fifth design variants that a fixed gear 12 of a first spur gear stage ST1 is connected through the fifth shaft 5 to the ring gear HR1 of the first planetary gear set RS1, whereas the ring gear HR1 of the first planetary gear set RS1 is connectable through the fifth shaft 5 and through the second shifting element K2 designed as a clutch to the planetary gear carrier PT3 of the third planetary gear set RS3. With the seventh design variant in accordance with FIG. 7, it is finally provided that an idler gear 12A of a first spur gear stage ST1 is connectable through the fifth shaft 5 and through the fourth shifting element K4 designed as a clutch and through the ninth shaft 9 to the ring gear HR1 of the first planetary gear set RS1 and to the planetary gear carrier PT3 of the third planetary gear set RS3.

With the first to sixth design variants in accordance with FIGS. 1 to 6, it is provided that a fixed gear 14 of a second spur gear stage ST2 is connected through the sixth shaft 6 to the ring gear HR2 of the second planetary gear set RS2. By contrast, with the seventh design variant in accordance with FIG. 7, it is provided that an idler gear 14A of a second spur gear stage ST2 is connectable through the sixth shaft 6 and through the third shifting element K3 designed as a clutch, and through the seventh shaft 7, to the ring gear HR2 of the second planetary gear set RS2.

Figure 1A:
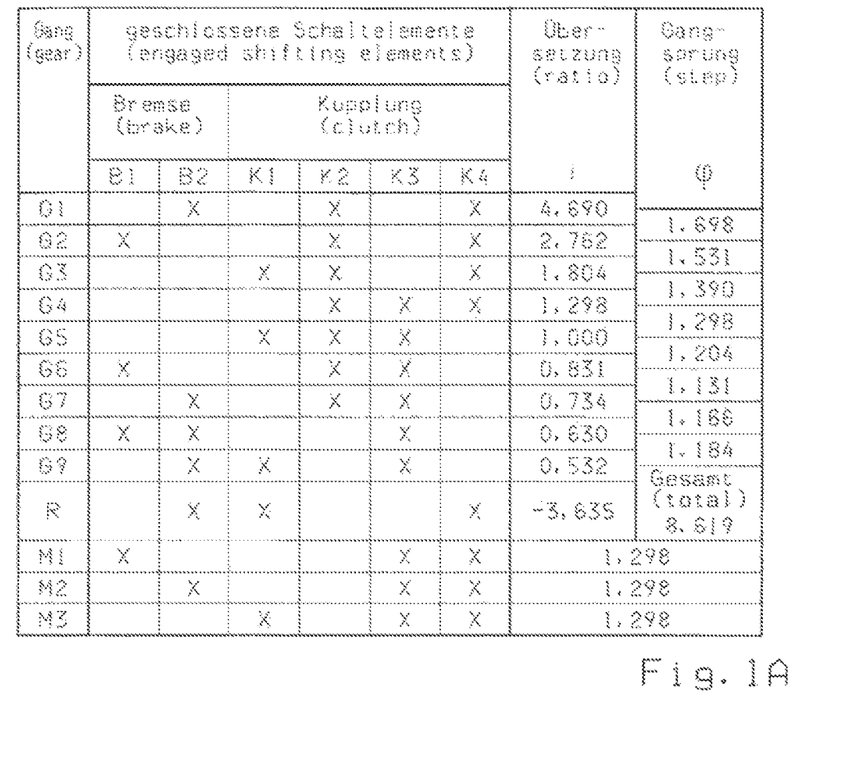
FIG. 1A is a shifting diagram for the design variant in accordance with FIG. 1.

For the six design variants, FIG. 1A shows a shifting diagram or a shifting matrix for the respective transmission variant. In the shifting diagrams, for the realization of the various gears, shifting elements K1, K2, K3, K4, B1, B2 to be locked or activated, as the case may be, are shown in table form, whereas a transmission ratio i is indicated for each gear and the respective gear jump φ is indicated between different gears. In addition to the nine forward gears G1, G2, G3, G4, G5, G6, G7, G8, G9 and the specified reverse gear R, additional shifting combinations are indicated as alternative fourth forward gears M1, M2, M3. As a whole, it also arises from the shifting diagram that the proposed multi-speed transmission features optimized transmission ratio sequences with low absolute and relative rotational speeds and low torques for the planetary gear sets and shifting elements. In addition, good degrees of toothing efficiency and low drag torques arise from the selected arrangements of the gear sets.

As preferred stationary transmission ratios, a value of approximately $i_0 = -2.015$ can be used for the first planetary gear set RS1, a value of approximately $i_0 = -1.700$ can be used for the second planetary gear set RS2, and a value of approximately $i_0 = -1.600$ can be used for the third planetary gear set RS3. As the stationary transmission ratio, a value of approximately $i_{ST1} = -1.804$ is selected for the first spur gear stage ST1, and a value of approximately $i_{ST2} = -1.000$ is selected for the second spur gear stage ST2. Moreover, it arises from the shifting diagram that, for shifting gears, each of the only three shifting elements is locked.

Specifically, it arises from the shifting diagram in accordance with FIG. 1A that, for the realization of the first forward gear G1, the second shifting element K2 designed as a clutch, the fourth shifting element K4 designed as a clutch, and the sixth shifting element B2 designed as a brake are locked. For the shifting of the second forward gear G2, the second shifting element K2 designed as a clutch, the fourth shifting element K4 designed as a clutch and the fifth shifting element B1 designed as a brake are locked. For the shifting of the third forward gear G3, the first shifting element K1 designed as a clutch, the second shifting element K2 designed as a clutch and the fourth shifting element K4 designed as a clutch are locked. For the shifting of the fourth forward gear G4, the second shifting element K2 designed as a clutch, the third shifting element K3 designed as a clutch and the fourth shifting element K4 designed as a clutch are locked. For the shifting of the fifth forward gear G5, the first shifting element K1 designed as a clutch, the second shifting element K2 designed as a clutch and the third shifting element K3 designed as a clutch are locked. For the shifting of the sixth forward gear G6, the second shifting element K2 designed as a clutch, the third shifting element K3 designed as a clutch and the fifth shifting element B1 designed as a brake are locked. For the shifting of the seventh forward gear G7, the second shifting element K2 designed as a clutch, the third shifting element K3 designed as a clutch and the sixth shifting element B2 designed as a brake are locked. For the shifting of the eighth forward gear G8, the third shifting element K3 designed as a clutch, the fifth shifting element B1 designed as a brake and the sixth shifting element B2 designed as a brake are locked. For the shifting of the ninth forward gear G9, the first shifting element K1 designed as a clutch, the third shifting element K3 designed as a clutch and the sixth shifting element B2 designed as a brake are locked. Finally, for the shifting of the reverse gear R, the first shifting element K1 designed as a clutch, the fourth shifting element K4 designed as a clutch and the sixth shifting element B2 designed as a brake are locked.

With respect to the shifting combinations of the alternative fourth forward gears M1, M2, M3, in accordance with the shifting diagram based on FIG. 1A, it is provided that, for the shifting of the alternative fourth forward gear M1, the third shifting element K3 designed as a clutch, the fourth shifting element K4 designed as a clutch and the fifth shifting element B1 designed as a brake are locked. For the shifting of the alternative fourth forward gear M2, the third shifting element K3 designed as a clutch, the fourth shifting element K4 designed as a clutch and the sixth shifting element B2 designed as a brake are locked. Furthermore, for the shifting of the alternative fourth forward gear M3, the first shifting element K1 designed as a clutch, the third shifting element K3 designed as a clutch and the fourth shifting element K4 designed as a clutch are locked.

The different transmission ratios i and the gear jumps φ between different gears with the various design variants can be taken from the corresponding shifting diagram in accordance with FIG. 1A.

Modifications and variations can be made to the embodiments illustrated or described herein without departing from the scope and spirit of the invention as set forth in the appended claims.

REFERENCE SIGNS

1 First shaft as a drive
2 Second shaft as an output
3 Third shaft
4 Fourth shaft
5 Fifth shaft
6 Sixth shaft
7 Seventh shaft
8 Eighth shaft
9 Ninth shaft
11 Housing
K1 First shifting element as a clutch
K2 Second shifting element as a clutch
K3 Third shifting element as a clutch
K4 Fourth shifting element as a clutch
B1 Fifth shifting element as a brake
B2 Sixth shifting element as a brake
RS1 First planetary gear set
RS2 Second planetary gear set
RS3 Third planetary gear set
SR1 Sun gear of the first planetary gear set
PT1 Planetary gear carrier of the first planetary gear set
HR1 Ring gear of the first planetary gear set
PT2 Planetary gear carrier of the second planetary gear set
HR2 Ring gear of the second planetary gear set
SR3 Sun gear of the third planetary gear set
PT3 Planetary gear carrier of the third planetary gear set
HR3 Ring gear of the third planetary gear set
ST1 First spur gear stage
ST2 Second spur gear stage
12 Fixed gear of the first spur gear stage
12A Idler gear of the first spur gear stage
13 Idler gear of the first spur gear stage
13A Fixed gear of the first spur gear stage
14 Fixed gear of the second spur gear stage
14A Idler gear of the second spur gear stage
15 Fixed gear of the second spur gear stage
15A Idler gear of the second spur gear stage
G1 First forward gear
G2 Second forward gear
G3 Third forward gear
G4 Fourth forward gear G5 Fifth forward gear
G6 Sixth forward gear
G7 Seventh forward gear
G8 Eighth forward gear
G9 Ninth forward gear
R Reverse gear
M1 Alternative fourth gear
M2 Alternative fourth gear
M3 Alternative fourth gear
i Transmission ratio
$i_0$ Stationary transmission ratios of the planetary gear sets
$i_{ST1}$ Stationary transmission ratio of the first spur gear stage
$i_{ST2}$ Stationary transmission ratio of the second spur gear stage
φ Gear jump

The invention claimed is:

1. A multi-speed transmission in planetary design for a vehicle, comprising:
   a housing (11);
   a first shaft (1) provided as a drive (AN), and a second shaft (2) provided as an output (Ab) and arranged axially parallel to the drive (AN);
   three planetary gear sets (RS1, RS2, RS3), a plurality of additional shafts (3, 4, 5, 6, 7, 8, 9), and six shifting elements (K1, K2, K3, K4, B1, B2) by which actuation of a plurality of gears are realized;
   first and second machine elements (ST1, ST2) that transfer of torque between the drive (AN) and the output (Ab), wherein the first and second machine elements comprise first and second spur gear stages (ST1, ST2);
   a fixed gear (12) of the first spur gear stage (ST1) is fixedly connected through a fifth shaft (5) of the plurality of additional shafts to a ring gear (HR1) of the first planetary gear set (RS1) and to a planetary gear carrier (PT3) of the third planetary gear set (RS3);
   the first shaft (1) connectable or connected to a sun gear (SR1) of the first planetary gear set (RS1), to a sun gear (SR3) of the third planetary gear set (RS3), and to a planetary gear carrier (PT2) of the second planetary gear set (RS2); and
   the second shaft (2) connectable or connected to the first machine element (ST1) and to the second machine element (ST2).

2. The multi speed transmission according to claim 1, wherein:
   the first shaft (1) is connectable through the first shifting element (K1) designed as a clutch and through a third shaft (3) of the plurality of additional shafts to the sun gear (SR1) of the first planetary gear set (RS1); and
   the sun gear (SR1) of the first planetary gear set (RS1) is connectable, through the fifth shifting element (B1) designed as a brake, to the housing (11).

3. The multi-speed transmission according to claim 1, wherein:
   a planetary gear carrier (PT1) of the first planetary gear set (RS1) and a ring gear (HR3) of the third planetary gear set (RS3) are connected through a fourth shaft (4) of the plurality of additional shafts; and
   the planetary gear carrier (PT1) of the first planetary gear set (RS1) and the ring gear (HR3) of the third planetary gear set (RS3) are connectable through the fourth shaft (4) and through the sixth shifting element (B2) designed as a brake to the housing (11).

4. The multi-speed transmission according to claim 1, wherein:
   a planetary gear carrier (PT1) of the first planetary gear set (RS1) is connectable through a fourth shaft (4) of the plurality of additional shafts, through the second shifting element (K2) designed as a clutch, and through a seventh shaft (7) of the plurality of additional shafts to a ring gear (HR3) of the third planetary gear set (RS3); and
   the planetary gear carrier (PT1) of the first planetary gear set (RS1) and the ring gear (HR3) of the third planetary gear set (RS3) are connectable through the fourth shaft (4) and through the sixth shifting element (B2) designed as a brake to the housing (11).

5. The multi-speed transmission according to claim 1, wherein:
   a fixed gear (14) of the second spur gear stage (ST2) is connected through a sixth shaft (6) of the plurality of additional shafts to a ring gear (HR2) of the second planetary gear set (RS2).

6. The multi-speed transmission according to claim 1, wherein:
   the first shaft (1) is connectable through the second shifting element (K2) designed as a clutch and through an eighth shaft (8) of the plurality of additional shafts to a sun gear (SR3) of the third planetary gear set (RS3);
   the first shaft (1) is connectable through the third shifting element (K3) designed as a clutch and through a seventh shaft (7) of the plurality of additional shafts to the planetary gear carrier (PT2) of the second planetary gear set (RS2);
   the second shaft (2) is connectable through the fourth shifting element (K4) designed as a clutch and through a ninth shaft (9) of the plurality of additional shafts to an idler gear (13) of the first spur gear stage (ST1); and
   the second shaft (2) is connected to a fixed gear (15) of the second spur gear stage (ST2).

7. The multi-speed transmission according to claim 1, wherein:
   the first shaft (1) is connected to a sun gear (SR3) of the third planetary gear set (RS3);
   the first shaft (1) is connectable through the third shifting element (K3) designed as a clutch and through an eighth shaft (8) of the plurality of additional shafts to the planetary gear carrier (PT2) of the second planetary gear set (RS2);
   the second shaft (2) is connectable through the fourth shifting element (K4) designed as a clutch and through a ninth shaft (9) of the plurality of additional shafts to an idler gear (13) of the first spur gear stage (ST1); and
   the second shaft (2) is connected to a fixed gear (15) of the second spur gear stage (ST2).

8. The multi-speed transmission according to claim 1, wherein:
   the first shaft (1) is connected to the planetary gear carrier (PT2) of the second planetary gear set (RS2);
   the first shaft (1) is connectable through the second shifting element (K2) designed as a clutch and through an eighth shaft (8) of the plurality of additional shafts to a sun gear (SR3) of the third planetary gear set (RS3);
   the second shaft (2) is connectable through the fourth shifting element (K4) designed as a clutch and through a ninth shaft (9) of the plurality of additional shafts to an idler gear (13) of the first spur gear stage (ST1); and
   the second shaft (2) is connectable through the third shifting element (K3) designed as a clutch and through a seventh shaft (7) of the plurality of additional shafts to an idler gear (15A) of the second spur gear stage (ST2).

9. The multi-speed transmission according to claim 1, wherein:
the first shaft (1) is connected to a sun gear (SR3) of the third planetary gear set (RS3) and to the planetary gear carrier (PT2) of the second planetary gear set (RS2);
the second shaft (2) is connectable through the fourth shifting element (K4) designed as a clutch and through a ninth shaft (9) of the plurality of additional shafts to an idler gear (13) of the first spur gear stage (ST1); and
the second shaft (2) is connectable through the third shifting element (K3) designed as a clutch and through an eighth shaft (8) of the plurality of additional shafts to an idler gear (15A) of the second spur gear stage (ST2).

10. The multi-speed transmission according to claim 1, wherein at least two of the planetary gear sets (RS1, RS2, RS3) are arranged radially one above the other.

11. The multi-speed transmission according to claim 10, wherein:
the first planetary gear set (RS1) and the second planetary set (RS2) are arranged radially one above the other; and
the first planetary gear set (RS1) is arranged radially inwardly and the second planetary set (RS2) is arranged radially outwardly; and
the first planetary gear set (RS1) and the second planetary set (RS2) are connected to each other through a ring gear (HR1) of the first planetary gear set (RS1).

12. The multi-speed transmission according to claim 1, wherein the transmission has at least nine forward gears (G1 to G9) and at least one reverse gear (R).

13. The multi-speed transmission according to claim 12, wherein the shifting elements (K1, K2, K3, K4, B1, B2) are frictional-locking or positive-locking shifting elements.

14. The multi-speed transmission according to claim 13, wherein:
for shifting of the first forward gear (G1), the second shifting element (K2) designed as a clutch, the fourth shifting element (K4) designed as a clutch, and the sixth shifting element (B2) designed as a brake are locked;
for shifting of the second forward gear (G2), the second shifting element (K2) designed as a clutch, the fourth shifting element (K4) designed as a clutch and the fifth shifting element (B1) designed as a brake are locked;
for shifting of the third forward gear (G3), the first shifting element (K1) designed as a clutch, the second shifting element (K2) designed as a clutch and the fourth shifting element (K4) designed as a clutch are locked;
for shifting of the fourth forward gear (G4), the second shifting element (K2) designed as a clutch, the third shifting element (K3) designed as a clutch and the fourth shifting element (K4) designed as a clutch are locked;
for shifting of the fifth forward gear (G5), the first shifting element (K1) designed as a clutch, the second shifting element (K2) designed as a clutch and the third shifting element (K3) designed as a clutch are locked;
for shifting of the sixth forward gear (G6), the second shifting element (K2) designed as a clutch, the third shifting element (K3) designed as a clutch and the fifth shifting element (B1) designed as a brake are locked;
for shifting of the seventh forward gear (G7), the second shifting element (K2) designed as a clutch, the third shifting element (K3) designed as a clutch and the sixth shifting element (B2) designed as a brake are locked;
for shifting of the eighth forward gear (G8), the third shifting element (K3) designed as a clutch, the fifth shifting element (B1) designed as a brake and the sixth shifting element (B2) designed as a brake are locked;
for shifting of the ninth forward gear (G9), the first shifting element (K1) designed as a clutch, the third shifting element (K3) designed as a clutch and the sixth shifting element (B2) designed as a brake are locked; and
for shifting of the reverse gear (R), the first shifting element (K1) designed as a clutch, the fourth shifting element (K4) designed as a clutch and the sixth shifting element (B2) designed as a brake are locked.

15. The multi-speed transmission according to claim 14, wherein for shifting of alternative fourth forward gears (M1, M2, M3):
the third shifting element (K3) designed as a clutch, the fourth shifting element (K4) designed as a clutch and the fifth shifting element (B1) designed as a brake are locked; or
the third shifting element (K3) designed as a clutch, the fourth shifting element (K4) designed as a clutch and the sixth shifting element (B2) designed as a brake are locked;
or the first shifting element (K1) designed as a clutch, the third shifting element (K3) designed as a clutch and the fourth shifting element (K4) designed as a clutch are locked.

16. A multi-speed transmission in planetary design for a vehicle, comprising:
a housing (11);
a first shaft (1) provided as a drive (AN), and a second shaft (2) provided as an output (Ab) and arranged axially parallel to the drive (AN);
three planetary gear sets (RS1, RS2, RS3), a plurality of additional shafts (3, 4, 5, 6, 7, 8, 9), and six shifting elements (K1, K2, K3, K4, B1, B2) by which actuation of a plurality of gears are realized;
first and second machine elements (ST1, ST2) that transfer of torque between the drive (AN) and the output (Ab), wherein the first and second machine elements comprise first and second spur gear stages (ST1, ST2);
a fixed gear (12) of the first spur gear stage (ST1) is connected through a fifth shaft (5) of the plurality of additional shafts to a ring gear (HR1) of the first planetary gear set (RS1); and
the ring gear (HR1) of the first planetary gear set (RS1) is connectable through the fifth shaft (5) and through the second shifting element (K2) designed as a clutch to a planetary gear carrier (PT3) of the third planetary gear set (RS3);
the first shaft (1) connectable or connected to a sun gear (SR1) of the first planetary gear set (RS1), to a sun gear (SR3) of the third planetary gear set (RS3), and to a planetary gear carrier (PT2) of the second planetary gear set (RS2); and
the second shaft (2) connectable or connected to the first machine element (ST1) and to the second machine element (ST2).

17. The multi-speed transmission according to claim 16, wherein:
the first shaft (1) is connectable through the first shifting element (K1) designed as a clutch and through a third shaft (3) of the plurality of additional shafts to the sun gear (SR1) of the first planetary gear set (RS1); and the sun gear (SR1) of the first planetary gear set (RS1) is connectable, through the fifth shifting element (B1) designed as a brake, to the housing (11).

18. The multi-speed transmission according to claim 16, wherein:
a planetary gear carrier (PT1) of the first planetary gear set (RS1) and a ring gear (HR3) of the third planetary gear set (RS3) are connected through a fourth shaft (4) of the plurality of additional shafts; and
the planetary gear carrier (PT1) of the first planetary gear set (RS1) and the ring gear (HR3) of the third planetary gear set (RS3) are connectable through the fourth shaft (4) and through the sixth shifting element (B2) designed as a brake to the housing (11).

19. The multi-speed transmission according to claim 16, wherein:
a fixed gear (14) of the second spur gear stage (ST2) is connected through a sixth shaft (6) of the plurality of additional shafts to a ring gear (HR2) of the second planetary gear set (RS2).

20. The multi-speed transmission according to claim 16, wherein:
the first shaft (1) is connected to a sun gear (SR3) of the third planetary gear set (RS3);
the first shaft (1) is connectable through the third shifting element (K3) designed as a clutch and through an eighth shaft (8) of the plurality of additional shafts to the planetary gear carrier (PT2) of the second planetary gear set (RS2);
the second shaft (2) is connectable through the fourth shifting element (K4) designed as a clutch and through a ninth shaft (9) of the plurality of additional shafts to an idler gear (13) of the first spur gear stage (ST1); and
the second shaft (2) is connected to a fixed gear (15) of the second spur gear stage (ST2).

21. The multi-speed transmission according to claim 16, wherein:
the first shaft (1) is connected to a sun gear (SR3) of the third planetary gear set (RS3) and to the planetary gear carrier (PT2) of the second planetary gear set (RS2);
the second shaft (2) is connectable through the fourth shifting element (K4) designed as a clutch and through a ninth shaft (9) of the plurality of additional shafts to an idler gear (13) of the first spur gear stage (ST1); and
the second shaft (2) is connectable through the third shifting element (K3) designed as a clutch and through an eighth shaft (8) of the plurality of additional shafts to an idler gear (15A) of the second spur gear stage (ST2).

22. The multi-speed transmission according to claim 16, wherein at least two of the planetary gear sets (RS1, RS2, RS3) are arranged radially one above the other.

23. The multi-speed transmission according to claim 22, wherein:
the first planetary gear set (RS1) and the second planetary set (RS2) are arranged radially one above the other; and
the first planetary gear set (RS1) is arranged radially inwardly and the second planetary set (RS2) is arranged radially outwardly; and
the first planetary gear set (RS1) and the second planetary set (RS2) are connected to each other through a ring gear (HR1) of the first planetary gear set (RS1).

24. The multi-speed transmission according to claim 16, wherein the transmission has at least nine forward gears (G1 to G9) and at least one reverse gear (R).

25. The multi-speed transmission according to claim 24, wherein the shifting elements (K1, K2, K3, K4, B1, B2) are frictional-locking or positive-locking shifting elements.

26. The multi-speed transmission according to claim 25, wherein:
for shifting of the first forward gear (G1), the second shifting element (K2) designed as a clutch, the fourth shifting element (K4) designed as a clutch, and the sixth shifting element (B2) designed as a brake are locked;
for shifting of the second forward gear (G2), the second shifting element (K2) designed as a clutch, the fourth shifting element (K4) designed as a clutch and the fifth shifting element (B1) designed as a brake are locked;
for shifting of the third forward gear (G3), the first shifting element (K1) designed as a clutch, the second shifting element (K2) designed as a clutch and the fourth shifting element (K4) designed as a clutch are locked;
for shifting of the fourth forward gear (G4), the second shifting element (K2) designed as a clutch, the third shifting element (K3) designed as a clutch and the fourth shifting element (K4) designed as a clutch are locked;
for shifting of the fifth forward gear (G5), the first shifting element (K1) designed as a clutch, the second shifting element (K2) designed as a clutch and the third shifting element (K3) designed as a clutch are locked;
for shifting of the sixth forward gear (G6), the second shifting element (K2) designed as a clutch, the third shifting element (K3) designed as a clutch and the fifth shifting element (B1) designed as a brake are locked;
for shifting of the seventh forward gear (G7), the second shifting element (K2) designed as a clutch, the third shifting element (K3) designed as a clutch and the sixth shifting element (B2) designed as a brake are locked;
for shifting of the eighth forward gear (G8), the third shifting element (K3) designed as a clutch, the fifth shifting element (B1) designed as a brake and the sixth shifting element (B2) designed as a brake are locked;
for shifting of the ninth forward gear (G9), the first shifting element (K1) designed as a clutch, the third shifting element (K3) designed as a clutch and the sixth shifting element (B2) designed as a brake are locked; and
for shifting of the reverse gear (R), the first shifting element (K1) designed as a clutch, the fourth shifting element (K4) designed as a clutch and the sixth shifting element (B2) designed as a brake are locked.

27. The multi-speed transmission according to claim 26, wherein for shifting of alternative fourth forward gears (M1, M2, M3):
the third shifting element (K3) designed as a clutch, the fourth shifting element (K4) designed as a clutch and the fifth shifting element (B1) designed as a brake are locked; or
the third shifting element (K3) designed as a clutch, the fourth shifting element (K4) designed as a clutch and the sixth shifting element (B2) designed as a brake are locked;
or the first shifting element (K1) designed as a clutch, the third shifting element (K3) designed as a clutch and the fourth shifting element (K4) designed as a clutch are locked.

28. A multi-speed transmission in planetary design for a vehicle, comprising:
a housing (11);
a first shaft (1) provided as a drive (AN), and a second shaft (2) provided as an output (Ab) and arranged axially parallel to the drive (AN);
three planetary gear sets (RS1, RS2, RS3), a plurality of additional shafts (3, 4, 5, 6, 7, 8, 9), and six shifting elements (K1, K2, K3, K4, B1, B2) by which actuation of a plurality of gears are realized;
first and second machine elements (ST1, ST2) that transfer of torque between the drive (AN) and the output (Ab), wherein the first and second machine elements comprise first and second spur gear stages (ST1, ST2);
an idler gear (12A) of a first spur gear stage (ST1) is connectable through a fifth shaft (5) of the plurality of additional shafts, through the fourth shifting element (K4) designed as a clutch, through a ninth shaft (9) of the plurality of additional shafts to a ring gear (HR1) of the first planetary gear set (RS1) and to a planetary gear carrier (PT3) of the third planetary gear set (RS3);
the first shaft (1) connectable or connected to a sun gear (SR1) of the first planetary gear set (RS1), to a sun gear (SR3) of the third planetary gear set (RS3), and to a planetary gear carrier (PT2) of the second planetary gear set (RS2); and
the second shaft (2) connectable or connected to the first machine element (ST1) and to the second machine element (ST2).

29. The multi-speed transmission according to claim 28, wherein:
the first shaft (1) is connectable through the first shifting element (K1) designed as a clutch and through a third shaft (3) of the plurality of additional shafts to the sun gear (SR1) of the first planetary gear set (RS1); and
the sun gear (SR1) of the first planetary gear set (RS1) is connectable, through the fifth shifting element (B1) designed as a brake, to the housing (11).

30. The multi-speed transmission according to claim 28, wherein:
a planetary gear carrier (PT1) of the first planetary gear set (RS1) and a ring gear (HR3) of the third planetary gear set (RS3) are connected through a fourth shaft (4) of the plurality of additional shafts; and
the planetary gear carrier (PT1) of the first planetary gear set (RS1) and the ring gear (HR3) of the third planetary gear set (RS3) are connectable through the fourth shaft (4) and through the sixth shifting element (B2) designed as a brake to the housing (11).

31. The multi-speed transmission according to claim 28, wherein:
an idler gear (14A) of the second spur gear stage (ST2) is connectable through a sixth shaft (6) of the plurality of additional shafts, through the third shifting element (K3) designed as a clutch, and through a seventh shaft (7) of the plurality of additional shafts to a ring gear (HR2) of the second planetary gear set (RS2).

32. The multi-speed transmission according to claim 28, wherein:
the first shaft (1) is connected to the planetary gear carrier (PT2) of the second planetary gear set (RS2);
the first shaft (1) is connectable through the second shifting element (K2) designed as a clutch and through an eighth shaft (8) of the plurality of additional shafts to the sun gear (SR3) of the third planetary gear set (RS3);
the second shaft (2) is connected to a fixed gear (13A) of the first spur gear stage (ST1); and
the second shaft (2) is connected to a fixed gear (15) of the second spur gear stage (ST2).

33. The multi-speed transmission according to claim 28, wherein at least two of the planetary gear sets (RS1, RS2, RS3) are arranged radially one above the other.

34. The multi-speed transmission according to claim 33, wherein:
the first planetary gear set (RS1) and the second planetary set (RS2) are arranged radially one above the other; and
the first planetary gear set (RS1) is arranged radially inwardly and the second planetary set (RS2) is arranged radially outwardly; and
the first planetary gear set (RS1) and the second planetary set (RS2) are connected to each other through a ring gear (HR1) of the first planetary gear set (RS1).

35. The multi-speed transmission according to claim 28, wherein the transmission has at least nine forward gears (G1 to G9) and at least one reverse gear (R).

36. The multi-speed transmission according to claim 35, wherein the shifting elements (K1, K2, K3, K4, B1, B2) are frictional-locking or positive-locking shifting elements.

37. The multi-speed transmission according to claim 36, wherein:
for shifting of the first forward gear (G1), the second shifting element (K2) designed as a clutch, the fourth shifting element (K4) designed as a clutch, and the sixth shifting element (B2) designed as a brake are locked;
for shifting of the second forward gear (G2), the second shifting element (K2) designed as a clutch, the fourth shifting element (K4) designed as a clutch and the fifth shifting element (B1) designed as a brake are locked;
for shifting of the third forward gear (G3), the first shifting element (K1) designed as a clutch, the second shifting element (K2) designed as a clutch and the fourth shifting element (K4) designed as a clutch are locked;
for shifting of the fourth forward gear (G4), the second shifting element (K2) designed as a clutch, the third shifting element (K3) designed as a clutch and the fourth shifting element (K4) designed as a clutch are locked;
for shifting of the fifth forward gear (G5), the first shifting element (K1) designed as a clutch, the second shifting element (K2) designed as a clutch and the third shifting element (K3) designed as a clutch are locked;
for shifting of the sixth forward gear (G6), the second shifting element (K2) designed as a clutch, the third shifting element (K3) designed as a clutch and the fifth shifting element (B1) designed as a brake are locked;
for shifting of the seventh forward gear (G7), the second shifting element (K2) designed as a clutch, the third shifting element (K3) designed as a clutch and the sixth shifting element (B2) designed as a brake are locked;
for shifting of the eighth forward gear (G8), the third shifting element (K3) designed as a clutch, the fifth shifting element (B1) designed as a brake and the sixth shifting element (B2) designed as a brake are locked;
for shifting of the ninth forward gear (G9), the first shifting element (K1) designed as a clutch, the third shifting element (K3) designed as a clutch and the sixth shifting element (B2) designed as a brake are locked; and
for shifting of the reverse gear (R), the first shifting element (K1) designed as a clutch, the fourth shifting element (K4) designed as a clutch and the sixth shifting element (B2) designed as a brake are locked.

38. The multi-speed transmission according to claim 37, wherein for shifting of alternative fourth forward gears (M1, M2, M3):
- the third shifting element (K3) designed as a clutch, the fourth shifting element (K4) designed as a clutch and the fifth shifting element (B1) designed as a brake are locked; or
- the third shifting element (K3) designed as a clutch, the fourth shifting element (K4) designed as a clutch and the sixth shifting element (B2) designed as a brake are locked,
- or the first shifting element (K1) designed as a clutch, the third shifting element (K3) designed as a clutch and the fourth shifting element (K4) designed as a clutch are locked.

* * * * *